United States Patent
Bourke et al.

(10) Patent No.: US 9,628,574 B2
(45) Date of Patent: Apr. 18, 2017

(54) SYSTEMS AND METHODS FOR STREAMLINED CONTENT DOWNLOAD

(75) Inventors: Adrian Bourke, San Diego, CA (US); Benjamin P. Morris, Victoria (CA); James A. Goode, San Diego, CA (US)

(73) Assignee: SweetLabs, Inc., San Diego, CA (US)

( * ) Notice: Subject to any disclaimer, the term of this patent is extended or adjusted under 35 U.S.C. 154(b) by 6 days.

(21) Appl. No.: 13/527,441

(22) Filed: Jun. 19, 2012

(65) Prior Publication Data

US 2012/0323995 A1    Dec. 20, 2012

Related U.S. Application Data

(60) Provisional application No. 61/499,072, filed on Jun. 20, 2011.

(51) Int. Cl.
    *G06F 15/16*  (2006.01)
    *H04L 29/08*  (2006.01)
    *H04N 21/218* (2011.01)
    *H04N 21/2225* (2011.01)
    (Continued)

(52) U.S. Cl.
    CPC ............. *H04L 67/20* (2013.01); *H04L 67/02* (2013.01); *H04L 67/289* (2013.01); *H04N 21/2181* (2013.01); *H04N 21/2225* (2013.01); *H04N 21/24* (2013.01); *H04N 21/47202* (2013.01)

(58) Field of Classification Search
    USPC ............... 709/203, 202; 726/4, 28; 707/781; 713/182
    See application file for complete search history.

(56) References Cited

U.S. PATENT DOCUMENTS

| 6,959,320 | B2  | 10/2005 | Shah et al. | |
| 7,536,725 | B2* | 5/2009  | Raciborski  | 726/30 |
| 7,657,885 | B2* | 2/2010  | Anderson    | 717/170 |

(Continued)

FOREIGN PATENT DOCUMENTS

WO    2012177664 A1    12/2012

OTHER PUBLICATIONS

International Search Report and Written Opinion for International Application PCT/US2012/43189, International Filing Date Jun. 19, 2012, Report Completed Aug. 12, 2012, Mailed Sep. 4, 2012, 6 pgs.

(Continued)

*Primary Examiner* — Tammy Nguyen
(74) *Attorney, Agent, or Firm* — KPPB LLP (57) ABSTRACT

Systems and methods in accordance with embodiments of the invention enable streamlined content download that minimizes user input during the download process. One embodiment includes a system for streamlined downloading of content to a user computing device, including: an application server system configured to locate an intermediary application in response to a request received from a user computing device; where the intermediary application includes a content ID and configures a user computing device to initialize a download manager on a user computing device, and to pass the content ID to the download manager; and where the download manager configures the user computing device to utilize the content ID to retrieve content access information, and download content from a content server system utilizing the content access information.

20 Claims, 5 Drawing Sheets

(51) Int. Cl.
*H04N 21/24* (2011.01)
*H04N 21/472* (2011.01)

(56) References Cited

U.S. PATENT DOCUMENTS

| | | | |
|---|---|---|---|
| 7,891,014 B2* | 2/2011 | Raciborski | 726/30 |
| 8,336,110 B2* | 12/2012 | Raciborski | 726/30 |
| 2004/0268146 A1* | 12/2004 | Oberst | G06F 21/604 726/6 |
| 2005/0021977 A1* | 1/2005 | Oberst | G06F 21/6218 713/182 |
| 2006/0031785 A1 | 2/2006 | Raciborski | |
| 2006/0136964 A1* | 6/2006 | Diez | A63F 13/12 725/37 |
| 2009/0025063 A1* | 1/2009 | Thomas | G06F 21/6218 726/4 |
| 2010/0023582 A1 | 1/2010 | Pedersen et al. | |
| 2010/0057884 A1 | 3/2010 | Brownell et al. | |
| 2011/0238501 A1* | 9/2011 | Almeida | G06Q 30/02 705/14.56 |
| 2012/0131683 A1* | 5/2012 | Nassar | G06F 17/301 726/28 |
| 2013/0054795 A1* | 2/2013 | Kang et al. | 709/224 |
| 2013/0111559 A1* | 5/2013 | Lomme | G06F 21/6245 726/4 |
| 2013/0160111 A1* | 6/2013 | Orr | G06F 21/6218 726/19 |
| 2013/0191445 A1* | 7/2013 | Gayman | H04L 29/06047 709/203 |
| 2014/0172915 A1* | 6/2014 | Herbach | H04L 63/105 707/781 |
| 2014/0229520 A1* | 8/2014 | Scott | H04L 45/00 709/202 |

OTHER PUBLICATIONS

DLNA, "Overview and Vision White Paper", Jun. 2004, 16 pgs.

* cited by examiner

SYSTEMS AND METHODS FOR STREAMLINED CONTENT DOWNLOAD

RELATED APPLICATION

This application claims priority to U.S. Provisional Application No. 61/499,072 filed Jun. 20, 2011, the disclosure of which is hereby incorporated herein in its entirety.

FIELD OF THE INVENTION

The present invention relates generally to content download and more specifically to systems and methods for downloading content that minimizes user input.

BACKGROUND

Downloading content over the internet is a common practice for computer software users. The term content can refer to any kind of file or set of files containing executable instructions and/or data. Content can include, but is not limited to, documents, images, fonts, audio, video or other data used for media playback as well as applications or programs, including applications or programs that download content. Often, in order to locally use content stored over a network, such as the Internet, the content is downloaded from a remote server via the Internet. However, downloading presents numerous challenges to a user before content is downloaded on a computer. Content for download can have various versions or compatibilities that are confusing for a user to decide which to download. The location and access of content over the Internet can be confusing as download links may become inactive or be disabled. Also, security features can hinder the user experience including where content requires additional security credentials, which also may need to be downloaded, before content can be accessed.

SUMMARY OF THE INVENTION

Systems and methods in accordance with embodiments of the invention enable streamlined content download that minimizes user input during the download process. One embodiment includes a system for streamlined downloading of content to a user computing device, including: an application server system configured to locate an intermediary application in response to a request received from a user computing device; where the intermediary application includes a content ID and configures a user computing device to initialize a download manager on a user computing device, and to pass the content ID to the download manager; and where the download manager configures the user computing device to utilize the content ID to retrieve content access information, and download content from a content server system utilizing the content access information.

In a further embodiment, the intermediary application is configured to check for the download manager on a user computing device and download the download manager to a user computing device when the download manager is not found.

In another embodiment, the intermediary application is configured to download the download manager from the application server.

In a still further embodiment, the intermediary application is configured to download a download manager utilizing at least one selected from the group consisting of: a bootstrapped download application, a metainstaller and a download link.

A still another embodiment includes an application that configures a user computing device to communicate with an advertising server system to obtain offers to present during the downloading of content.

In a yet further embodiment, the application further causes analysis of the user computing device and forwards the analysis to the advertising server system.

In yet another embodiment, the analysis of the user computing device includes collecting information stored on the user computing device during the download.

In a further embodiment again, the application is at least one selected from the group consisting of: a client application bundled with the intermediary application; a client application bundled with the download manager; the intermediary application; and the download manager.

In another embodiment again, the download manager is configured to launch the downloaded content.

In a further additional embodiment, the download manager is a current version of the download manager.

In another additional embodiment, the application server is configured to enable download of an intermediary application to a user computing device in response to a request to access an intermediary application.

A still yet further embodiment includes a method for streamlined downloading of content to a user computing device, the method including: receiving a request from a user computing device at an application server; and locating an intermediary application in response to the request from the user computing device; where the intermediary application includes content ID and configures the user computing device to initialize a download manager on a user computing device and to pass the content ID to the download manager; and where the download manager configures the user computing device to utilize the content ID to retrieve content access information from a content access server, and download content from a content server system utilizing the content access information.

In still yet another embodiment, the intermediary application is configured to check for the download manager on a user computing device and download the download manager to a user computing device when the download manager is not found.

In a still further embodiment again, the intermediary application is configured to download the download manager from the application server Still another embodiment again includes.

In a still further additional embodiment, the intermediary application is configured to download a download manager utilizing at least one selected from the group consisting of: a bootstrapped download application, a metainstaller and a download link.

A still another additional embodiment includes an application that configures a user computing device to communicate with an advertising server system to obtain offers to present during the downloading of content.

In a yet further embodiment again, the application further causes analysis of the user computing device and forwards the analysis to the advertising server system.

In yet another embodiment again, the analysis of the user computing device includes collecting information stored on the user computing device during the download.

In a yet further additional embodiment, the application is at least one selected from the group consisting of: a client application bundled with the intermediary application; a client application bundled with the download manager; the intermediary application; and the download manager.

In yet another additional embodiment, the download manager configures the user computing device to retrieve content access information from a flat file.

DETAILED DESCRIPTION

Turning now to the drawings, systems and methods for streamlined content download that minimize user input during the download process in accordance with embodiments of the invention are illustrated. In many embodiments, a user need only begin a download process for the content to be installed or downloaded locally on the user computer or processor (i.e. no further user input is necessary for the download to complete once the user has provided the initial instruction to download the content). In several embodiments, by beginning a download, a user starts a chain of autonomous events executed by applications that manage the downloading process.

In several embodiments, the streamlined downloading of content to a user computing device can be facilitated by accessing an intermediary application. The intermediary application checks whether a download manager program is present on the user computing device. In the event that a download manager is not present, the intermediary application initiates the downloading of a download manager to the user computer device. The intermediary application facilitates the downloading of content by initializing the download manager using a content identifier (content ID) that the download manager can utilize to retrieve content access information. The download manager completes the downloading of the content to the user computing device by utilizing the content access information to obtain the content from a content server system.

In many embodiments, a user can begin an installation process by running an intermediary application that includes a content ID. The execution of the intermediary application can be initiated by selecting a link within a web browser application and/or another type of application. In particular embodiments, an intermediary application is written in JavaScript or any executable scripting language and executes within a virtual machine within the web browser application. The intermediary application can be accessed from an application server system. The intermediary application can be stored in a database or in a flat file structure or any other file structure suitable for rapid retrieval of the intermediary application. As noted above, the intermediary application checks for the presence of a download manager on the user computing device. If there is no download manager detected, then the intermediary application causes the user computing device to download the download manager. A user computing device can include any network connected device including but not limited to PCs, mobile phones, tablet computers, game consoles, optical disk players, televisions, and cameras. The download manager can be downloaded to the user computing device using a bootstrapped download application modified to download the download manager, a dedicated metainstaller accessible by the intermediary application, or using the traditional approach of opening the appropriate download link and manually accessing the downloaded content. The download manager can be downloaded from an application server system. In certain embodiments, a download manager is a browser plugin that facilitates content download by retrieving content access information to download and access content. In other embodiments, the download manager can be a desktop application, integrated within the operating system of the computer device and/or take any other form appropriate to the requirements of a specific application.

During a download process in accordance with embodiments of the invention, the intermediary application passes a content ID to the download manager. In particular embodiments, the content ID is a string with identifying information regarding the content, including where to find content access information. The download manager can use the content ID to acquire content access information for content associated with the content ID. In multiple embodiments, content access information, including content location and security access information is stored on a content access server. In many embodiments, the content access information is stored in a flat file or any storage structure capable of storing content access information accessible by a download manager including (but not limited to) a database.

In several embodiments, the download manager uses content access information to download content directly from a location indicated in the content access information. In many embodiments, the downloaded content is a program or application (such as an installer) and the download manager launches the downloaded content. Thereby, user input is minimized to only opening a link or running an intermediary application that automatically downloads and/or launches the desired content. In certain embodiments, the download manager is run without installation on the user computing device and terminates after the download manager downloads the content while in other embodiments the download manager is installed on the user computing device and left on the user computing device after the download manager downloads the content.

A variety of embodiments include a user interface that gives a user information about a download without requiring user input and/or can integrate information concerning a download with existing user programs or devices. Certain embodiments also include auto updating, pausing and resuming of downloads, queuing of multiple consecutive downloads, or restricting access to only authorized users, programs or applications via a security interface.

In a number of embodiments, intermediary applications and/or download managers automatically filter for the appropriate content ID or content access information by detecting and filtering for the operating system version, operating system build, computer processor type, user language or other features of the user computing device or other device. Various embodiments utilize a set of HyperText Markup Language (HTML) or JavaScript which a website can use to detect features of the user computing device or other device(s).

In several embodiments, offers (such as advertisements) can be displayed during streamlined content download. In certain embodiments, offers can be displayed during the download of an intermediary application, download manager and/or during the download of content using a download manager. Displayed offers can be obtained from an advertising network that presents offers to users of a user computing device based upon a client application bundled or integrated with the intermediary application and/or the download manager, where the client application is capable of analyzing the user computing device and communicating with the advertising network to coordinate the provision of offers to the user. Systems and methods for presenting offers during a download is discussed in U.S. patent application Ser. No. 12/398,136 entitled "Advertising and Promotional System", filed Mar. 4, 2009, the disclosure of which is hereby incorporated by reference in its entirety.

Although specific means for streamlined content download are discussed above, streamlined content download can be implemented in accordance with many embodiments of the invention as appropriate for the requirements of a specific application. Streamlined content download processes including, but not limited to, the use of intermediary applications and download managers to download content in accordance with embodiments of the invention are discussed further below.

System Architecture for Streamlined Content Download

Figure 1:
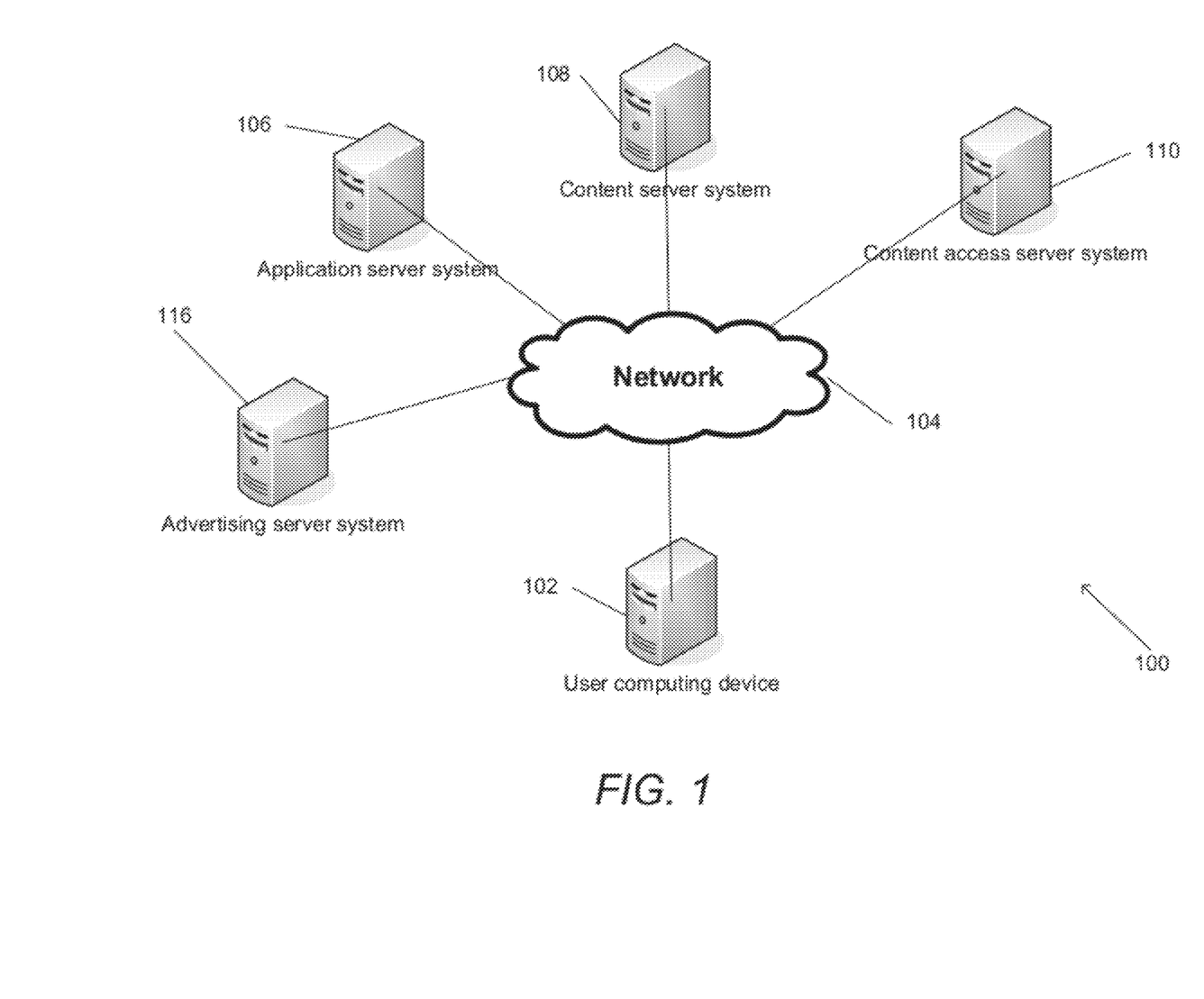
FIG. 1 illustrates a system for streamlined content download in accordance with an embodiment of the invention.

System architectures for streamlined content download can utilize an intermediary application and a download manager on a user computing device to download content from a content server system to a user computing device. A system for streamlined content download in accordance with an embodiment of the invention is illustrated in FIG. 1. The system 100 includes a user computing device 102. The user computing device 102 is connected to a network 104, such as the Internet. An application server system 106, a content server system 108, a content access server system 110, and an advertising server system 116 are also connected to the network 104.

In many embodiments, a user can utilize a user computing device 102 to access content over a network, such as but not limited to the Internet. A user computing device 102 can download content via accessing an intermediary application by communicating with an application server system 106. In certain embodiments, a user computing device 102 can retrieve an intermediary application from the application server system 106 using a link (such as but not limited to a URL) that identifies the intermediary application. The intermediary application can be a script, application or program. In many embodiments, the intermediary application includes a content ID and is configured to check the user computing device 102 for a download manager.

In several embodiments, a content access server system 110 maintains content access information. In particular embodiments, the content access server system 110 can retrieve content access information stored in a flat file structure or any other file structure suitable for rapid retrieval of content access information. In certain embodiments, a content access server system 110 can maintain a content access database where content access information can be accessed with a look up table where a content ID corresponds to associated content access information.

In several embodiments, content access information can include information that a download manager can utilize to access content including a content location such as a Uniform Resource Identifier (URI) or any security detail such as a key or password used to access the content. In other embodiments, any information appropriate to a specific application can be used to access content. In certain embodiments, content access information can provide access to content stored on a content server system 108. By utilizing the content access information, a download manager can obtain content from the content server system.

In numerous embodiments, advertising is provided from an advertising server system 116 while streamlined download of content is being performed. In several embodiments, a client application bundled with an intermediary application and/or download manager analyzes the user computing device 102 to determine the types of offers appropriate for the user computing device 102 or the user of the user computing device, sends a request for appropriate offers to an advertising server system 116, receives offers from the advertising server system 116 and displays the appropriate offer to a user of the user computing device during streamlined content download. In other embodiments, the intermediary application and/or download manager is configured to perform the functions described above with respect to the client application. The offers provided to the user can include advertisements, audio and/or media, links to a web site, provision of a web server or any other type of presentation that can be displayed, viewed or executed on the user device. In many embodiments, offers are selected according to criteria including, but not limited to, the offers most likely to be accepted by users of the downloaded content, offers a content publisher chooses to provide and/or other criteria designed to provide users with useful recommendations and/or generate revenue.

Although specific system architectures are discussed above, any system architecture for streamlined content download can be utilized in accordance with embodiments of the invention as appropriate for the requirements of a specific application. Processes for streamlined content download are discussed below.

Processes for Streamlined Content Download

Streamlined content download in accordance with many embodiments of the invention can be implemented utilizing an intermediary application that initializes a download manager to download content. The download manager can download content utilizing a content ID provided by the intermediary application, which enables the download manager to locate content access information and download content to a user device.

Figure 2:
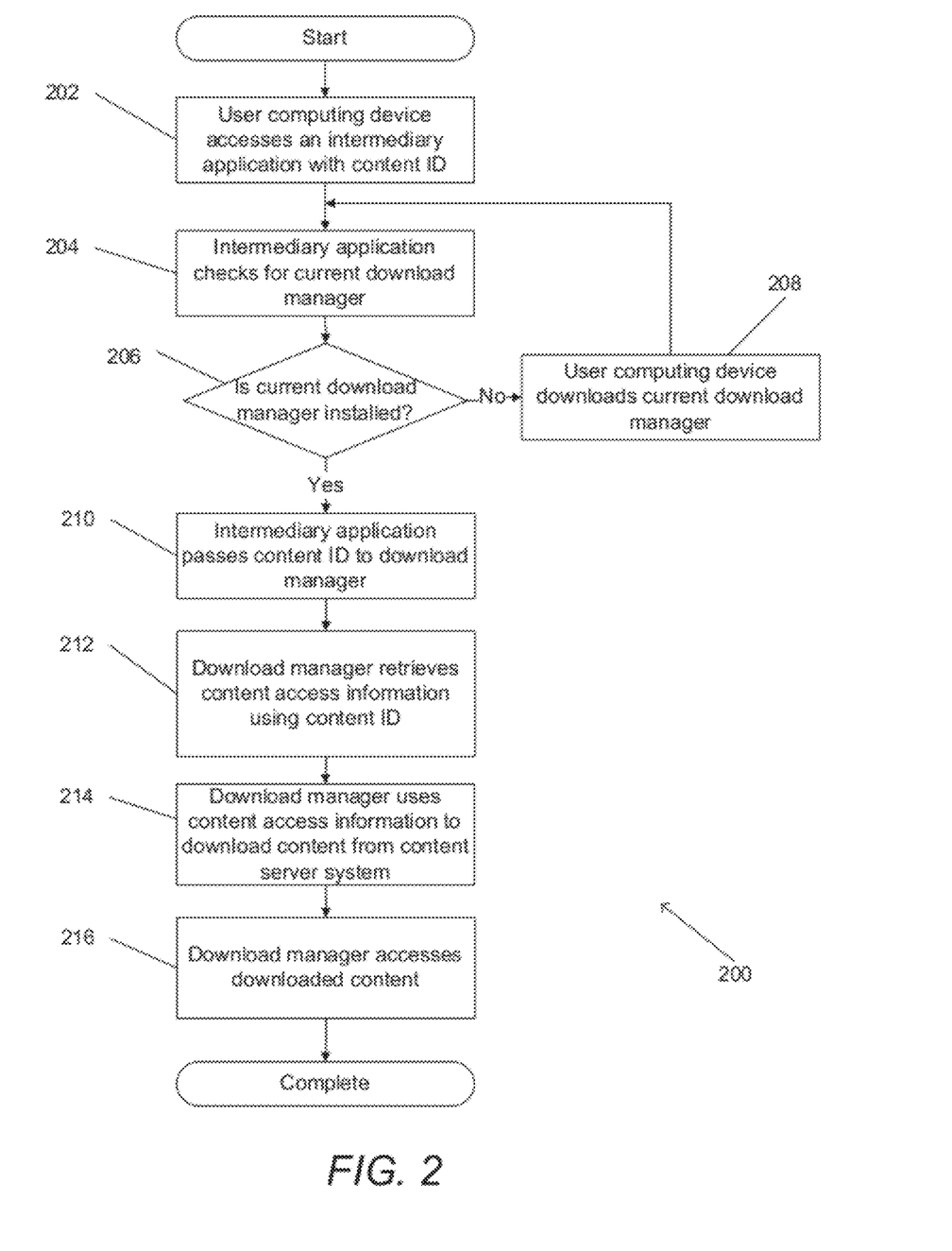
FIG. 2 is a flow chart illustrating a process for streamlined content download in accordance with an embodiment of the invention.

A streamlined downloading process in accordance with an embodiment of the invention is illustrated in FIG. 2. The process 200 includes using a user computing device to access (202) an intermediary application that includes at least one content ID. In particular embodiments, accessing an intermediary application can include downloading the intermediary application to the user computing device and initializing the intermediary application. In certain embodiments, accessing an intermediary application can include initializing the intermediary application to run remote from the user computing device. After the intermediary application is accessed (202), the intermediary application then checks (204) for a current version of the download manager on the user computing device. A decision (206) is made as to whether the current download manager is installed. If the current download manager is not installed, the user computing device will download (208) the current download manager and the intermediary application then returns to checking (204) for access to a current download manager. In certain embodiments, the current download manager can be downloaded from the application server system. If the current download manager is installed, then the intermediary application passes (210) the content ID to the download manager. When the download manager receives the content ID from the intermediary application, the download manager then retrieves (212) content access information using the content ID. In certain embodiments, content access information is retrieved from any location capable of storing content access information, including but not limited to content access information in a content access server system or a flat file accessible by a download manager. After retrieving the content access information, the download manager uses the content access information to download (214) content from a content server system. In certain optional embodiments, after downloading the content, the download manager can access (216) the downloaded content, such as by running the content when the content is an installer that installs an application on the user computing device. In several embodiments, a client application bundled with an intermediary application and/or the download manager analyzes the user computing device and displays advertising during the streamlined content download process.

An intermediary application in accordance with many embodiments of the invention is accessed on an application server system. In several embodiments, the intermediary application is accessed via a download link located on a download webpage hosted by an application server system. In a variety of embodiments, an intermediary application is a web browser plugin or a native code plugin that responds to a request to start a download or installation. An intermediary application can also include metadata identifying it as an intermediary application, such as a metadata tag, that can appear in a link to the intermediary application or the title of the intermediary application itself. An intermediary application can also include information such as (but not limited to): the version(s) of a download manager supported by the intermediary application; the user identification; the content description; content playback or installation requirements such as (but not limited to) operating system or minimum processor requirements; and/or security controls such as (but not limited to) keys or passwords used to access the intermediary application and/or the content. In many embodiments, an intermediary application is stored locally and so the user computing device does not need to download the intermediary application in order for the intermediary application to check for the download manager.

A download manager in accordance with many embodiments of the invention is initialized by an intermediary application and downloads content to a user computing device utilizing content access information. In several embodiments, a download manager is a native code installation manager. In various embodiments, a download manager can be invoked by browser plugins as a medium integrity process and include security access requirements for use only by authorized users. In many embodiments, a download manager automatically retries a download after a download fails or seeks user input as to whether to retry the download. In a variety of embodiments, a download manager sends information about its activities (including data on the downloaded content, quantity of downloads or download speeds) to a server system over a network. In a variety of embodiments, downloading a current version of the download manager can either download the entire current version of the download manager or download one or more updates that bring an older version of a download manager to the current version. In numerous embodiments, a download manager runs in the background of a user computing device, periodically looks for an updated version and automatically updates itself. In a number of embodiments, a download manager is updated when a user computing device has downloaded the current version and is about to be shut down.

Although specific processes for streamlined content download are discussed above, any process for streamlined content download in accordance with many embodiments of the invention can be utilized as appropriate for the requirements of a specific application. Processes for accessing an application server system are discussed below.

Accessing an Application Server System

Figure 3:
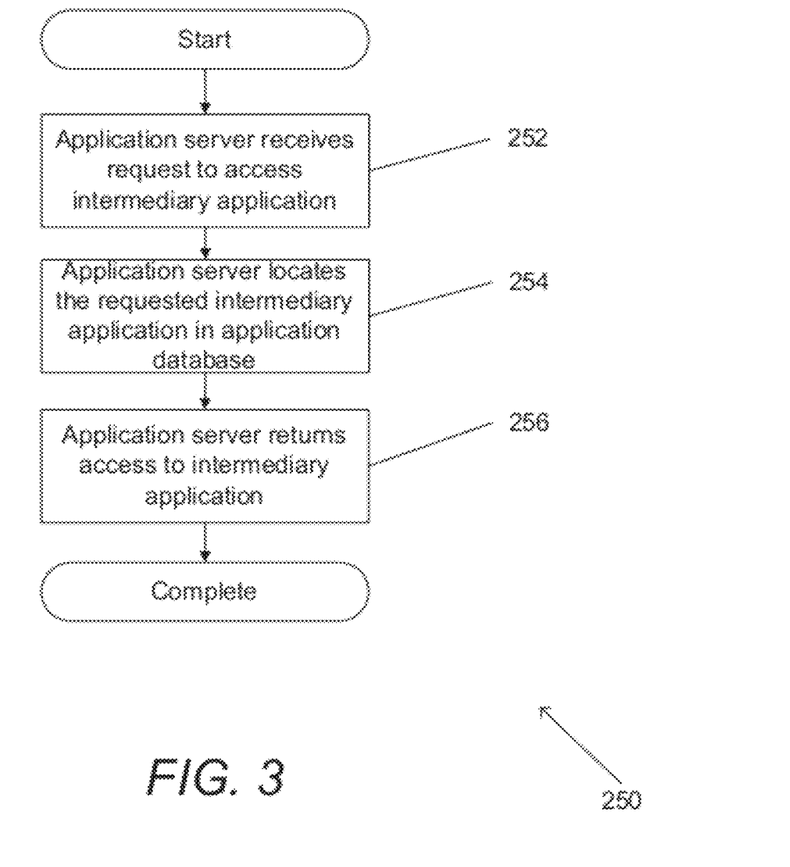
FIG. 3 is a flow chart illustrating a process for an application server system providing access to an intermediary application in accordance with an embodiment of the invention.

An application server system in accordance with many embodiments of the invention can provide access to an intermediary application. A flow chart illustrating a process for providing access to an intermediary application using an application server system in accordance with an embodiment of the invention is illustrated in FIG. 3. The process 250 includes an application server system receiving (252) a request to access an intermediary application. In certain embodiments, the request can come from an application, such as a web browser, running on a user computing device. After the application server system receives (252) the request, the application server system can locate (254) the intermediary application, such as from a flat file accessible by the application server system or by querying an application database maintained by the application server system for the requested intermediary application. After locating (254) for the requested intermediary application, the application server system can provide access (256) to the intermediary application in response to the request. After the application server system provides access to the intermediary application, the intermediary application can be initialized.

Although specific processes for providing access to an intermediary application by an application server system are discussed above, any process can provide access to an intermediary application in accordance with embodiments of the invention can be utilized as appropriate for the requirements of a specific application. Processes for downloading a download manager are discussed below.

Download Manager Download Processes

Download managers in accordance with many embodiments of the invention can be initialized by an intermediary application. In several embodiments, a download manager is first downloaded before it is initialized. An intermediary application can initiate a download of a download manager to a user computing device. In many embodiments, the intermediary application can download the download manager utilizing any of a variety of processes including (but not limited to) executing a bootstrapped download application, a metainstaller or utilizing a download link to download the download manager.

In several embodiments, a metainstaller is bundled with the intermediary application or is otherwise available to the intermediary application, such as already being locally available. A metainstaller is a dedicated installer for a download manager. In certain embodiments, a metainstaller is a native code application that installs a download manager. In various embodiments a metainstaller is used only if there are no available bootstrapped download applications. In some embodiments, a metainstaller can also be used only with the proper security authorization such as by authorized users with the proper key.

In a variety of embodiments, a bootstrapped download application is an application that is locally available on the user computing device that can be utilized to download a download manager. In several embodiments, the bootstrapped download application is bundled with a web browser as a plugin. In a number of embodiments, the bootstrapped download application has been specifically adapted to download a download manager. In certain embodiments, a bootstrapped download application includes a .Net framework or ClickOnce, both developed by Microsoft Corporation headquartered in Redmond, Wash. .Net is a software framework that runs primarily on Microsoft Windows and includes a large library supporting several programming languages, allowing interoperability. ClickOnce enables a user to install and run a windows application by clicking on a link on a webpage. Bootstrapped download applications can also be written in Java, developed by Oracle Corporation headquartered in Redwood Shores, Calif. Certain embodiments include bootstrapped download applications as small online only managed code applications that run the metainstaller. Bootstrapped download applications can be hosted on an application server system or other server or be invoked when running an intermediary application. Bootstrapped download applications can be customized for a piece of content for download, such as including the name of the content that will ultimately be downloaded or installed on the user computing device.

Figure 4:
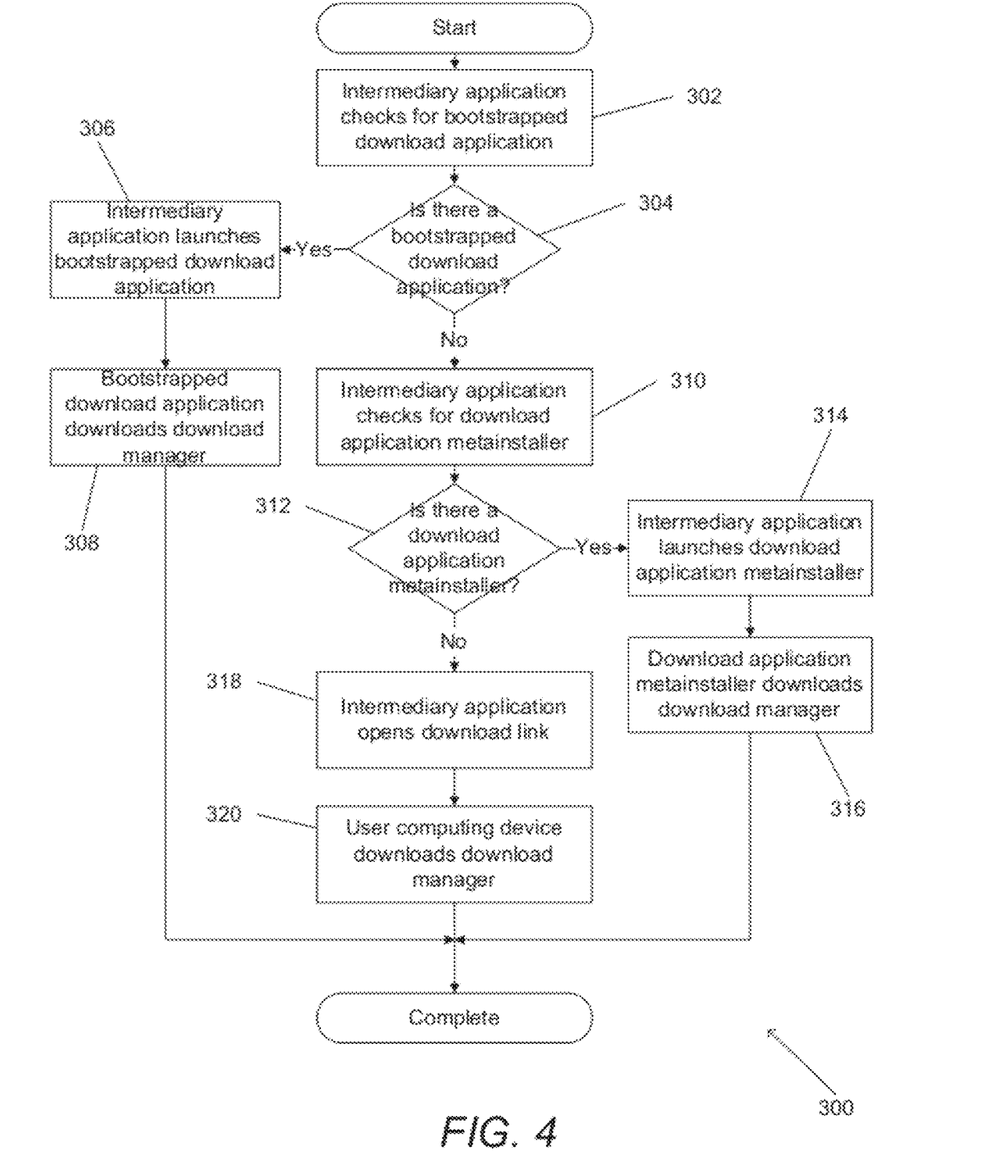
FIG. 4 is a flow chart illustrating a process for downloading a download manager in accordance with an embodiment of the invention.

A process for downloading a download manager in accordance with an embodiment of the invention is illustrated in FIG. 4. The process 300 includes an intermediary application checking (302) for any bootstrapped download applications. A decision (304) is then made as to whether there is a bootstrapped download application on the user computing device. If there is a bootstrapped download application, the intermediary application launches (306) the bootstrapped download application. After launching (306) the bootstrapped download application, the bootstrapped download application downloads (308) the download manager from an application server system. After downloading (308) the download manager, the process is complete. If there is no bootstrapped download application, the intermediary application checks (310) for a metainstaller. A decision (312) is made as to whether there is a metainstaller. If there is a metainstaller, then the intermediary application launches (314) the metainstaller. After launching (314) the metainstaller, the metainstaller downloads (316) the download manager from an application server system. After downloading (316) the download manager, the process is complete. If there is no metainstaller, then the intermediary application opens (318) a download link enabling download of the download manager to the user device. After opening the download link, the user computing device downloads (320) the download manager from an application server system.

In a variety of embodiments, an intermediary application checks for a metainstaller after checking for any bootstrapped download applications. Alternatively, in numerous embodiments, an intermediary application checks for any bootstrapped download applications after checking for a metainstaller. In certain embodiments, a metainstaller or a bootstrapped download application is downloaded from an application server system. Although a specific order for determining whether a bootstrapped download application, metainstaller or download link is available to a user computing device is described, an assessment of what is available to enable the install of a download manager can be performed in any order, in accordance with many embodiments of the invention as appropriate for a specific application. Furthermore, in a number of embodiments, the intermediary application is configured to present offers via the user computing device during the process of downloading the download manager.

Although specific processes for downloading a download manager are discussed above, any process for downloading a download manager in accordance with embodiments of the invention can be utilized as appropriate for the requirements of a specific application. Processes for retrieving content access information are discussed below.

Content Access Information Retrieval Processes

Figure 5:
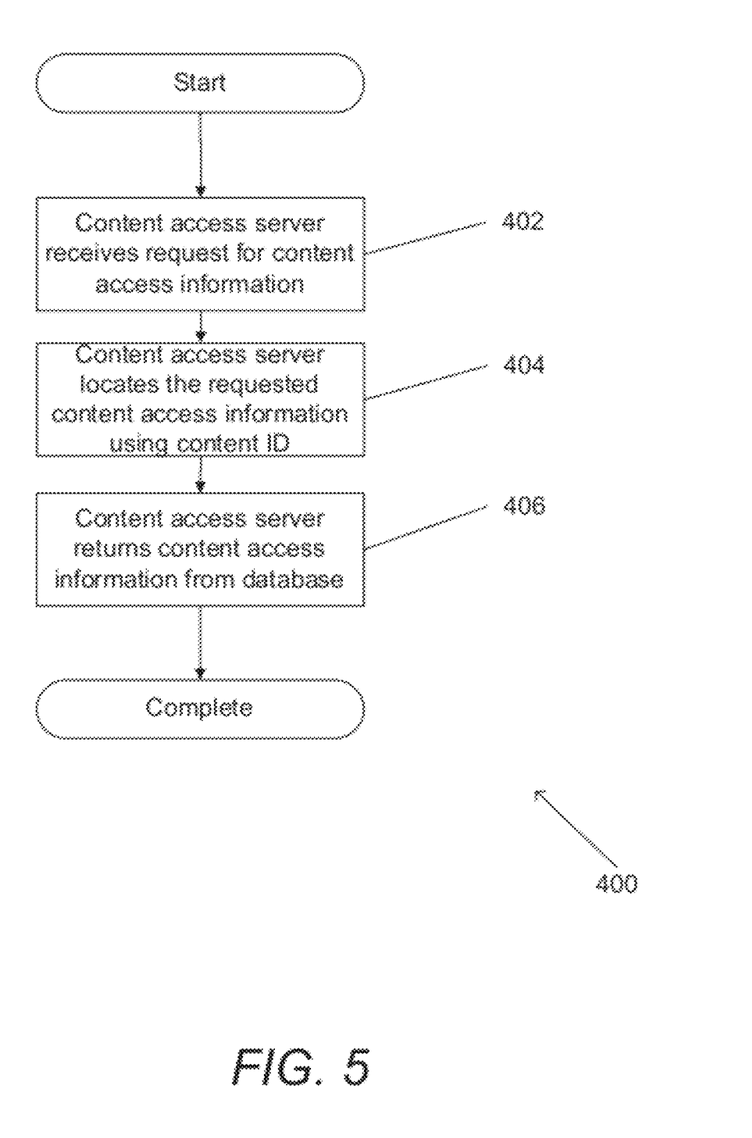
FIG. 5 is a flow chart illustrating a process that can be used by a download manager to retrieve content access information from a content access server system in accordance with an embodiment of the invention.

Content access information in accordance with many embodiments of the invention can be retrieved from any source capable of storing content access information, including but not limited to a content access server system or a flat file. A process for retrieving content access information in accordance with an embodiment of the invention is illustrated in FIG. 5. The process 400 includes a content access server system receiving (402) a request for content access information from a download manager using at least one content ID. After receiving (402) the request, the content access server system can locate the content access information, such as from a flat file accessible by the content access server system or to query a content access database maintained by the content access server system utilizing the content ID. After locating (404) for the requested content access information, the content access server system can retrieve and return (406) the content access information from the content access server system to the download manager.

In many embodiments, content access information can be retrieved from any location, such as a flat file or a database using a look up table by looking up the appropriate content access information using the content ID provided from an intermediary application. In several embodiments, a flat file includes a flat file database accessible by a download manager from where a download manager can retrieve content access information according to content ID. In many embodiments, a download manager can access a flat file locally stored on a user computing device.

Although specific processes for retrieving content access information are discussed above, any process for retrieving content access information in accordance with many embodiments of the invention can be utilized as appropriate for the requirements of a specific application.

While the above description contains many specific embodiments of the invention, these should not be construed as limitations on the scope of the invention, but rather as an example of one embodiment thereof. It is therefore to be understood that the present invention may be practiced otherwise than specifically described, without departing from the scope and spirit of the present invention. Thus, embodiments of the present invention should be considered in all respects as illustrative and not restrictive.

What is claimed is:

1. A system for streamlined downloading of content to a user computing device, comprising:
an application server system configured to locate an intermediary application in response to a request received from a user computing device;
wherein the intermediary application includes a content ID and directs the user computing device to:
initialize a download manager on the user computing device; and
pass the content ID to the download manager, where the content ID identifies the location of at least one piece of content access information comprising security access information for the at least one piece of content;

wherein the download manager directs the user computing device to utilize the content ID to retrieve the content access information; and wherein the download manager directs the user computing device to download content from a content server system utilizing the content access information.

2. The system of claim 1, wherein the intermediary application is directed to check for the download manager on a user computing device and download the download manager to a user computing device when the download manager is not found.

3. The system of claim 2, wherein the intermediary application is directed to download the download manager from the application server.

4. The system of claim 2, wherein the intermediary application is directed to download a download manager utilizing at least one selected from the group consisting of: a bootstrapped download application, a metainstaller, and a download link.

5. The system of claim 1, further comprising an application that directs a user computing device to communicate with an advertising server system to obtain offers to present during the downloading of content.

6. The system of claim 5, wherein the application further causes analysis of the user computing device and forwards the analysis to the advertising server system.

7. The system of claim 6, wherein the analysis of the user computing device comprises collecting information stored on the user computing device during the download.

8. The system of claim 5, wherein the application is at least one selected from the group consisting of: a client application bundled with the intermediary application, a client application bundled with the download manager; the intermediary application, and the download manager.

9. The system of claim 1, wherein the download manager is directed to launch the downloaded content.

10. The system of claim 1, wherein the download manager is a current version of the download manager.

11. The system of claim 1, wherein the application server is directed to allow download of an intermediary application to a user computing device in response to a request to access an intermediary application.

12. A method for streamlined downloading of content to a user computing device, the method comprising:
receiving a request from the user computing device at an application server; and
locating an intermediary application in response to the request from the user computing device, where the intermediary application includes content ID and directs the user computing device to initialize a download manager on a user computing device and to pass the content ID to the download manager, where the content ID identifies the location of at least one piece of content access information comprising security access information for the at least one piece of content;
retrieving content access information from a content access server based on the content ID using the user computing device; and
downloading content from a content server system based on the content access information using the user computing device.

13. The method of claim 12, wherein the intermediary application is directed to check for the download manager on a user computing device and download the download manager to a user computing device when the download manager is not found.

14. The method of claim 13, wherein the intermediary application is directed to download the download manager from the application server.

15. The method of claim 13, wherein the intermediary application is directed to download a download manager utilizing at least one selected from the group consisting of: a bootstrapped download application, a metainstaller, and a download link.

16. The method of claim 12, further comprising an application that directs a user computing device to communicate with an advertising server system to obtain offers to present during the downloading of content.

17. The method of claim 16, wherein the application further causes analysis of the user computing device and forwards the analysis to the advertising server system.

18. The method of claim 17, wherein the analysis of the user computing device comprises collecting information stored on the user computing device during the download.

19. The method of claim 16, wherein the application is at least one selected from the group consisting of: a client application bundled with the intermediary application, a client application bundled with the download manager; the intermediary application, and the download manager.

20. The method of claim 12, wherein the download manager directs the user computing device to retrieve content access information from a flat file.

* * * * *